W. J. HUNTER.
ENGINE.
APPLICATION FILED JAN. 22, 1919.
1,375,514.
Patented Apr. 19, 1921.
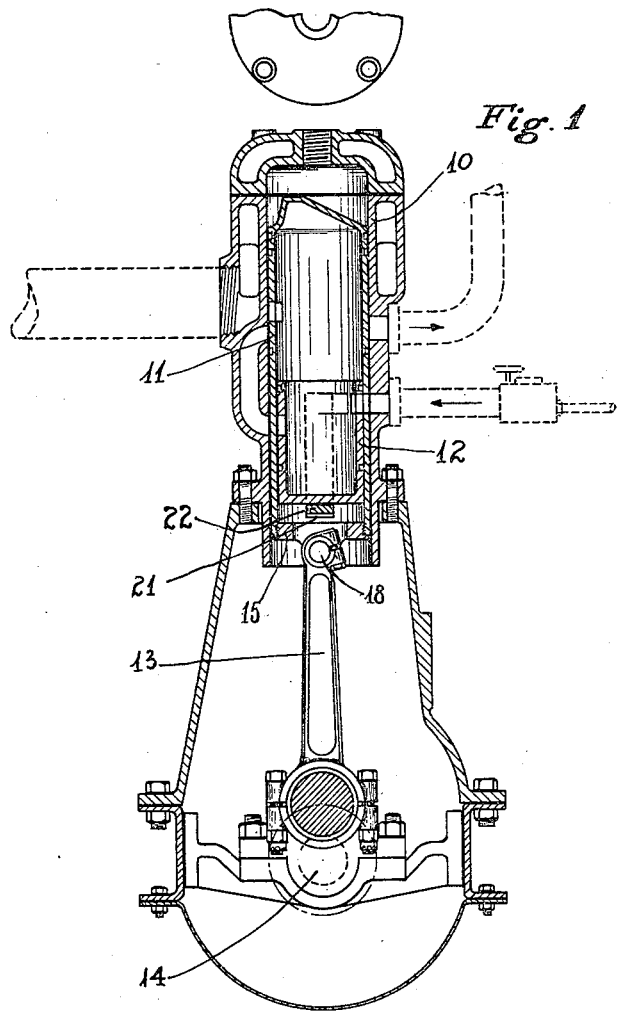
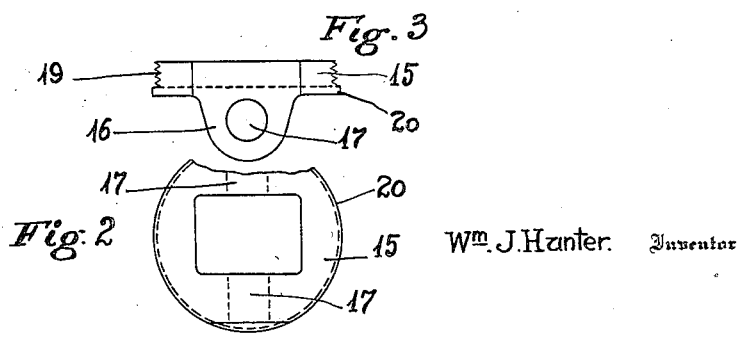
Wm. J. Hunter, Inventor
Attorneys

UNITED STATES PATENT OFFICE.

WILLIAM J. HUNTER, OF DENVER, COLORADO, ASSIGNOR TO THE HUNTER GAS ENGINE AND DEVELOPMENT COMPANY, A CORPORATION OF COLORADO.

ENGINE.

1,375,514. Specification of Letters Patent. Patented Apr. 19, 1921.

Application filed January 22, 1919. Serial No. 272,602.

*To all whom it may concern:*

Be it known that I, WILLIAM J. HUNTER, a citizen of the United States, residing at Denver, in the county of Denver and State of Colorado, have invented certain new and useful Improvements in Engines; and I do hereby declare the following to be a full, clear, and exact description of the invention, such as will enable others skilled in the art to which it appertains to make and use the same.

This invention relates to engines, and while particularly intended to apply to engines of the internal combustion type is not limited thereto.

The subject-matter of the present invention is disclosed in connection with an internal combustion engine of the type which forms the subject-matter of Patent Number 1,181,892 issued to applicant the second day of May, 1916, but it is to be understood that the application of the invention is not limited to the particular type of internal combustion engine so disclosed.

A further object of the invention is to provide an improved type of connection between the piston of an engine and the connecting rod, and has to do with a threaded connection with means for preventing rotation of the piston whereby the threaded connection is unscrewed.

A further object of the invention is to provide means for connecting a connecting rod with a piston whereby the entire thrust in both directions is taken and carried upon a shoulder bearing against a complementary shoulder of the adjacent part.

With these and other objects in view the present invention comprises certain novel constructions, combinations and arrangements of parts such as will be hereinafter more fully described and claimed.

In the drawings:

Figure 1 is a view of an engine of the type described, showing the cylinder in diametrical section and the connection between the piston and connecting rod;

Fig. 2 is a plan view of the threaded collar forming the connection between the connecting rod and the piston;

Fig. 3 is a side elevation of the collar.

Like characters of reference indicate corresponding parts throughout the several figures.

The present invention is disclosed in the drawings as comprising a cylinder 10 and piston 11 with a compression member or cup 12 slidingly disposed within the piston 11 whereby an initial compression of the explosive charge within the piston 11 is accomplished on the explosive stroke of such piston. The construction and operation of the piston cylinder and compression means however is not material to the present invention, said invention residing in the manner of attaching the piston 11 to the connecting rod 13. Likewise, the connecting of the connecting rod 13 with the drive shaft 14 is immaterial to the present invention and is of substantially the usual and ordinary crank type.

The connection between the connecting rod 13 and the piston 11 comprises a collar 15 having spaced ears 16, through the openings 17 of which a pin 18 is inserted, extending also through the end of the connecting rod 13, with the usual and ordinary means for taking up wear between the connecting rod 13 and the pin 18, which forms no part of the present invention.

The collar 15 is screwthreaded as indicated at 19, and engages complementary screwthreads formed in the interior of the inner end of the piston, shown in the drawings as the lower end. A shoulder 20 is provided, of greater diameter than the threaded portion, which when the collar is set abuts against the inner end of the piston, whereby the thrust in either direction, either that of the explosive thrust or the compression thrust of the connecting rod upon the piston, is taken upon the shoulder 20 and is not carried by the screwthreads.

It is obvious that if the piston 11 were free to rotate within the cylinder 10 the result would be the unscrewing of the screwthreaded connection between the collar 15 and the piston. The collar is of course held against rotation by its connection with the connecting rod 13, which in turn is connected with the crank of the drive shaft 14, and the piston 11 is held against rotation by the means disclosed in said Patent Number 1,181,892; comprising slots 21 formed in the piston, with a bar 22 extending transversely across the cylinder and through the slots of the piston, which bar incidentally carries the cup 12, but prevents any inclination toward rotation in the piston 11, whereby the piston 11 and connecting rod 13 are held against rotative movement relative to each other and the screwthreaded connection between the collar 15 and the piston 11 is maintained.

What I claim is:

In an internal combustion engine having a cup piston, the interior walls of said cup being adapted for relative reciprocative movement with an interior member, means for preventing the rotation of said cup piston, and a screw cap for said cup having spaced depending ears adapted to mount a removable pitman.

In testimony whereof I affix my signature.

WILLIAM J. HUNTER.